United States Patent [19]

Blount

[11] 4,262,108

[45] Apr. 14, 1981

[54] PROCESS FOR THE PRODUCTION OF POLYISOCYANATE SILICATE PLASTICS UTILIZING AN ALKALI METAL CELLULOSE SILICATE CONDENSATION PRODUCT

[76] Inventor: David H. Blount, 5450 Lea St., San Diego, Calif. 92105

[21] Appl. No.: 169,973

[22] Filed: Jul. 18, 1980

Related U.S. Application Data

[63] Continuation of Ser. No. 29,202, Apr. 12, 1979, Pat. No. 4,220,757.

[51] Int. Cl.$^3$ .............................................. C08B 31/00
[52] U.S. Cl. ......................................... 528/44; 260/9; 260/37 N; 521/110; 521/154; 525/356; 525/386; 528/25; 528/29; 528/425; 536/56; 536/84; 536/101; 536/111

[58] Field of Search .................. 536/101, 111, 84, 56; 260/9, 37 N; 528/76, 25, 29, 44, 425; 525/356, 386; 521/110, 154

[56] References Cited

U.S. PATENT DOCUMENTS

| | | | |
|---|---|---|---|
| 4,220,757 | 9/1980 | Blount | 536/84 |
| 4,226,982 | 10/1980 | Blount | 536/101 |

*Primary Examiner*—Morton Foelak

[57] ABSTRACT

This invention relates to a process for preparing polyisocyanate silicate plastics by reaction of an alkali metal cellulose silicate condensation product with a compound having at least two isocyanate groups to produce a polyisocyanate silicate prepolymer. The prepolymer is then reacted with an organic compound to produce a polyisocyanate silicate plastic.

18 Claims, No Drawings

PROCESS FOR THE PRODUCTION OF POLYISOCYANATE SILICATE PLASTICS UTILIZING AN ALKALI METAL CELLULOSE SILICATE CONDENSATION PRODUCT

CROSS-REFERENCE TO RELATED APPLICATIONS

This application is a continuation of my earlier U.S. Patent Application, Ser. No. 029,202, filed Apr. 12, 1979 now U.S. Pat. No. 4,220,757.

BACKGROUND OF THE INVENTION

This invention relates to a process for the production of polyisocyanate silicate plaster utilizing a cellulose silicate condensation product, an organic compound having at least two isocyanate groups, an organic amphiphilous compound and a curing agent and/or activator.

The products produced by this invention have many commercial uses and may be utilized as thermal-insulating material, noise-insulating material, floatation materials in boats, shock-resistant packaging, cushions, as fiber, as coating agents, as fillers, as impregnating agents, as adhesives, as casting material, as putty materials, as caulking materials, as constructional components of a building, etc. The products are novel, economical, possess improved heat- and flame-resistant properties and some have wood-like physical properties. The products may be produced by spraying or mixing in place.

In the process according to the invention, at least 3 components are used to produce the novel polyisocyanate silicate plastics as follows:

1. Component A: an alkali metal cellulose silicate condensation product;
2. Component B: an organic polyisocyanate or polyisothiocyanate;
3. Component C: an amphiphilous organic compound;
4. Component D: optionally, a curing agent and/or activator.

COMPONENT A

Component A, an alkali metal cellulose silicate condensation product, is produced by the processes outlined in my copending U.S. Patent Application Ser. No. 029,202, filed Apr. 12, 1979, and is incorporated into this invention.

Alkali metal cellulose silicate polymers are produced by mixing 3 parts by weight of a cellulose-containing plant or plant derivative with 1 to 2 parts by weight of an oxidated silicon compound and 2 to 5 parts by weight of an alkali metal hydroxide, then heating the mixture at 150° C. to 220° C. while agitating for 5 to 60 minutes.

Any suitable plant or the products of plants which contain cellulose may be used in this invention. The plant material is preferred to be in the form of small dry particles such as sawdust. Suitable plants include, but are not limited to, trees, bushes, agricultural plants, weeds, straw, vines, flowers, kelp, algae and mixtures thereof. Wood is the preferred plant. Commercial and agricultural waste products may be used, such as stalks, paper, cotton cloths, bagasse, etc. Wood fibers (wood pulp) with the lignin removed may be used in this invention. Plants that have been partially decomposed, such as humus, peat, certain soft brown coal, manure containing cellulose, etc., may also be used in this invention.

Any suitable oxidated silicon compound may be used in this invention. Suitable oxidized silicon compounds include silica, e.g., hydrated silica, hydrated silica containing Si-H bonds (silicoformic acid), silica sol, silicic acid, silica, etc.; alkali metal silicates, e.g., sodium silicate, potassium silicate, lithium silicate, etc., natural silicates with free silicic acid groups and mixtures thereof. Silica is the preferred oxidated silicon compound.

Any suitable alkali metal hydroxide may be used in this invention. Suitable alkali metal hydroxides include sodium hydroxide, potassium hydroxide and mixtures thereof. Sodium hydroxide is the preferred alkali metal hydroxide.

The process for the production of alkali metal-cellulose-silicate condensation product may be found in my copending U.S. Patent Application, Ser. No. 029,202, filed Apr. 12, 1979, and is incorporated in this Application.

The broken down alkali metal plant silicate condensation products are produced by mixing about 3 parts by weight of a cellulose-containing plant in the form of small particles with 1 to 2 parts by weight of a fine, granular oxidated silicon compound and 2 to 5 parts by weight of an alkali metal hydroxide. The mixture is then heated to 150° C. to 220° C. while agitating for 5 to 60 minutes, thereby producing a water-soluble alkali metal cellulose silicate condensation product. The condensation product is ground into small particles or powder. Care must be taken to avoid having the mixture catch on fire. Sodium hydroxide is the preferred alkali metal silicate and hydrated silica is the preferred oxidated silicon compound. Wood is the preferred plant.

Any unreacted wood or oxidated silicon compound may be used as a filler.

COMPONENT B

The polyisocyanate organic silicate solid/cellular solid products may be modified or improved by adding organic compounds, inorganic compounds, and/or organic-silicate compounds and polymers. These compounds may be added before the isocyanate and the oxidated silicon compounds are reacted together, or they may be added after the polyisocyanate silicate prepolymer is produced. Organic polyols, polyesters, polyether glycols, organic polyol silicates, polyester silicates and polysulfides, polybutadiene, butadiene-styrene copolymers and butadiene-acrylonitrile copolymers which contain free hydroxyl groups may be used in this invention. These hydroxyl-containing compounds (polyols), polymers and copolymers may be first reacted with a polyisocyanate to produce a liquid isocyanate-terminated polyurethane prepolymer, and this may be used in this invention. The polyols may be reacted chemically with oxidated silicon compounds to produce organic hydroxyl silicate compounds and their condensation products and may be used in this process. The method to produce the organic hydroxy silicate compounds and condensation products (polyester silicate polymers) may be found in U.S. Patent Application Ser. No. 765,050, filed on Feb. 2, 1977 by David H. Blount, M.D. The oxidated silicon compounds may be first reacted with a polycarboxylic acid and/or a polycarboxylic acid anhydride to produce a silicic acid organic acid anhydride which may then be reacted with a polyol to produce a polyester silicate polymer which may be used in this invention.

Any suitable polyisocyanate or polyisothiocyanate may be used in this invention: for example, arylene polyisocyanates such as tolylene; metaphenylene; 4-chlorophenylene-1,3; methylene-bis (phenylene-4); biphenylene-4,4'; 3,3'-dimethoxybiphenylene-4,4'; 3,3-diphenylbiphenylene-4,4'; napthalene-1,5; and tertrahydronaphthalene-1,5-diisocyanate and triphenylmethane triisocyanate; alkylene polyisocyanates such as ethylene; ethylidine; propylene-1,2; butylene-1,4; butylene-1,3; hexylene-1,6; decamethylene-1,10; cyclohexylene-1,2; cyclohexylene-1,4; and methylene-bis (cyclohexyl-4,4) diisocyanates. Phosgenation products of aniline-formaldehyde condensation may be used, such as polyphenyl-polymethylene polyisocyanates. Polyisothiocyanates, inorganic polyisothiocyanates, polyisocyanates which contain carbodimide groups as described in German Pat. No. 1,092,007 and polyisocyanates which contain urethane groups, allophanate groups, isocyanaturate groups, urea groups, imide groups or biuret groups may be used to produce polyisocyanate silicate prepolymers or polyisocyanate organic silicate solid/cellular solid products. Mixtures of the above-mentioned polyisocyanates may be used.

It is generally preferred to use commercial, readily available polyisocyanates such as toluene-2,4 and -2,6-diisocyanate and any mixture of these isomers, ("TDI"), ("crude MDI"), polyphenyl-polymethylene-isocyanates obtained by aniline-formaldehyde condensation followed by phosgenation, and modified polyisocyanates which contain carbondiimide groups. urethane groups, allophanate groups, isocyanurate groups, urea groups, imide groups or biuret groups ("modified polyisocyanates") and mixtures thereof.

Other polyisocyanates may be used in this invention, such as polyisocyanates which contain ester groups such as those listed in British Pat. Nos. 956,474 and 1,086,404; in U.S. Pat. Nos. 3,281,378 and 3,567,763; polyisocyanate reaction products with acetals according to German Pat. No. 1,072,385; polyisocyanates prepared by telomerization reactions as described in Belgian Pat. No. 723,640; polyphenyl-polymethylene polyisocyanates as described in British Patent Specification Nos. 874,430 and 848,671; polyisocyanates which contain carbodiimide groups as described in German Pat. No. 1,092,007; perchlorinated arylpolyisocyanates such as those described, e.g, in German Pat. No. 1,157,601; polyisocyanates which contain allophanate groups as described, e.g., in British Pat. No. 994,890 and in Belgian Pat. No. 761,628; and the diisocyanates described in U.S. Pat. No. 3,492,330; polyisocyanates which contain biuret groups as described, e.g., in German Pat. No. 1,101,394; in British Pat. No. 889,050; and in French Pat. No. 7,017,514; polyisocyanates which contain isocyanurate groups as described, e.g., in German Pat. Nos. 1,022,789 and 1,027,394; and in British Pat. Nos. 1,091,949, 1,267,011 and 1,305,036; polyisocyanates which contain acylated urea groups according to U.S. Pat. No. 3,517,139; and polyisocyanates which contain urethane groups as described, e.g., in Belgian Pat. No. 752,261; or in U.S. Pat. No. 3,394,164. Mixtures of the above-named polyisocyanates may be used. Organic polyisocyanates which are modified with ionic groups, for example, with carboxyl and/or carboxylate groups and/or sulphonic acid groups and/or sulphonate groups may be used with the polyisocyanates in this invention. Polyisocyanates may be reacted with alkali metal silicates such as sodium metasilicate pentahydrate, potassium metasilicate pentahydrate, dry granular crude sodium silicate, and dry granular lithium silicate to produce polyisocyanate alkali metal silicate prepolymer with terminal isocyanate groups or terminal alkali metal silicate groups and may be used with the polyisocyanates in this invention. The polyisocyanate is mixed with the dry granular alkali metal silicate, then heated to 30° C. to 40° C. while agitating at ambient pressure for 10 to 30 minutes, thereby producing a polyisocyanate prepolymer. Any of the suitable non-ionic hydrophilically modified organic polyisocyanates may be used in this invention.

Suitable polyisocyanates such as the aromatic diisocyanates may be reacted with organic compounds which contain at least two hydrogen atoms capable of reacting with isocyanates, preferably with a molecular weight of, generally, from 300 to about 10,000 and in the ratio of from 50–99 mols of aromatic diisocyanates with 1 to 50 mols of said organic compounds to produce isocyanate-terminated reaction products. It is preferred to use polyols (organic polyhydroxyl compounds), in particular, compounds and/or polymers which contain from 2 to 8 hydroxyl groups, especially those with a molecular weight of from about 800 to about 10,000 and preferably from 1,000 to about 6,000, e.g., polyesters, polyethers, polythioethers, polyacetals, polycarbonates or polyester amides containing at least 2, generaly from 2 to 8, but preferably from 2 to 4 hydroxyl groups, of the kind known for producing homogeneous and cellular polyurethanes. Compounds which contain amino groups, thiol groups or carboxyl groups may be used. Polyhydroxyl compounds (polyols) which already contain urethane or urea groups, modified or unmodified natural polyols, e.g., castor oil, carbohydreates and starches, may also be used. Additional products of alkylene oxides with phenolformaldehyde resins or urea-formaldehyde resins are also suitable for the purpose of the invention. Polybutadiene polymers with free hydroxyl groups, polysulfide polymers, polybutadienestyrene copolymers and butadiene-acrylonitrile copolymer chains are also suitable for the purpose of the invention.

Polyesters (polyols) containing hydroxyl groups may be, for example, reaction products of polyhydric alcohols, preferably dihydric alcohols and polybasic, preferably dibasic, carboxylic acids. The corresponding polycarboxylic acid anhydride or corresponding polycarboxylic acid esters of lower alcohols or their mixture may be used instead of the free polycarboxylic acids for preparing the polyesters. The polycarboxylic acid may be aliphatic, cycloaliphatic, aromatic and/or heterocyclic and may be substituted, e.g. with halogen atoms and may be unsaturated. Examples include succinic acid, adipic acid, suberic acid, azelaic acid, sebacic acid, phthalic acid, isophthalic acid, trimetallic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bis-glycol terephthalate. Any suitable polyhydric alcohol (Polyol) may be used such as, for example, ethylene glycol, propylene-1,2- and -1,3-glycol, butylene-1,4- and -2,3-glycol, hexane-1,6-diol, octane-1,8-diol, neopentyl glycol, cyclohexanedimethol-(1,4-bis-hydroxymethylcyclohexane), 2-methyl-propane-1,3-diol, glycerol, trimethylol propane, hexane-1,2,6-triol, butane- 1,2,4-triol, trimethylol ethane, pentaerythritol, quinitol, mannitol, sorbitol, glucose, starches, fructose, cane sugar, dextrines, castor oils, methylglycoside, diethylene glycol, triethylene glycol, tetraethylene glycol, polyethylene glycols, dipropyleneglycol, polypropylene glycols, dibutylene glycol and polybutylene glycols. The polyesters may also contain a proportion of carboxyl end groups. Polyesters of lactones, such as E-caprolactone or hydroxycarboxylic acids, such as W-hydroxycaproic acid, may also be used.

The polyethers with at least 2, generally from 2 to 8 and preferably 2 or 3 hydroxyl groups, used according to the invention, are known and may be prepared, e.g., by the polymerization of epoxides, e.g., ethylene oxide, propyleneoxide, butylene oxide, tetraydrofuran, styrene oxide or epichlorohydrin, each with itself, e.g., in the presence of $BF_3$ or by addition of these epoxides, optionally in mixtures or successively, to starting components which contain reactive hydrogen atoms such as alcohols or amines, e.g., water, ethylene glycol, propylene-1,3- or -1,2-glycol, trimethylol propane, 4,4'-dihydroxydiphenylpropane, aniline, ammonia, ethanolamine or ethylenediamine. Sucrose polyethers such as those described, e.g., in German Pat. Nos. 1,176,358 and 1,064,938 may also be used according to this invention. It is frequently preferred to use polyethers which contain predominantly primary OH groups (up to 90% by weight, based on the total OH group content of the polyether). Also suitable are polyethers modified with Vinyl polymers such as those which may be obtained by polymerizing styrene or acrylonitrile in the presence of polyethers (U.S. Pat. Nos. 3,383,351; 3,304, 273; 3,525,093 and 3,110,695; and German Pat. No. 1,152,536) and polybutadienes which contain OH groups.

"Polythioethers" mean, in particular, the condensation of products of thiodiglycol with itself and/or with other glycols, dicarboxylic acids, formaldehyde, aminocarboxylic acids or amino alcohols. The products obtained are plythio-mixed ethers, polytheiether esters or polythioether ester amides, depending on the co-component.

The polyacetals used may be, for example, the compounds which may be obtained from glycols, e.g., diethylene glycol, triethylene glycol (4,4'-dihydroxydiphenyldimethylmethane), hexanediol and formaldehyde. Polyacetals suitable for the invention may also be prepared by the polymerization of cyclic acetals.

The polycarbonates with hydroxyl groups used may be of the known kind, e.g., those which may be prepared by reacting diols, e.g., propane-1,3-diol, butane-1,4-diol and/or hexane-1,6-diol or diethylene glycol, triethylene glycol or tetraethylene glycol, with diarylcarbonates, e.g., diphenylcarbonate or phosgene.

The polyester amides and polyamides include, e.g., the predominantly linear condensates obtained from polyvalent saturated and unsaturated carboxylic acids or their anhydrides and polyvalent saturated and unsaturated amino alcohols, diamines, polyamines and mixtures thereof.

Examples of these compounds which are to be used, according to the invention, have been described, e.g., in High Polymers, Volume XVI, "Polyurethanes, Chemistry and Technology", published by Saunders-Frisch, Interscience Publishers, New York, London, Volume I, 1962, pages 32 to 42 and pages 44 to 54 and Volume II, 1964, pages 5 and 6 and pages 198 and 199; and in Kundstoff-Handbuch, Volume VII, Vieweg-Hochtlen, Carl-Hanser-Verlag, Munich, 1966, e.g., on pages 45 to 71.

Suitable modified organic polyisocyanates, as well as their propolymers, especially those based on aromatic polyisocyanates, can also be subsequently modified to give ionic groups, for example, by reaction with sulfones, beta-lactones, and by grafting on acrylic acid, methacrylic acid or crotonic acid, for example, or by sulphuric acid, chlorosulphonic acid, oleum or sulphur trioxide and then used in the invention. In particular, organic polyisocyanates such as tolylene diisocyanate, diphenylmethane diisocyanate, hexamethylene diisocyanate and the known phosgenation products of the condensation products of aromatic monoamines, especially aniline and aldehyde, especially formaldehyde which is reacted with sulphuric acid, oleum or sulphur trioxide, may be used in this invention. Sulphonated polyisocyanates of this kind which generally still contain ureadione, urea and biuret groups and, in particular, where polyol modification has been carried out before sulphonation, urethane and/or allophanate groups which are formed through secondary reactions during sulphonation are, therefore, particularly preferred as polyisocyanates containing ionic groups. The NCO terminated prepolymers used, for example, for the production of aqueous polyurethane dispersions (U.S. Pat. No. 3,756,992) can be used for the process according to the invention.

COMPONENT C

Component C contains organic amphiphilous compounds, preferably containing from 1 to 9 carbon atoms, and has a molecular weight of from 12 to about 400, preferably from 32 to 150, which contains one OH group and/or at least one other hydrophilic and/or polar group. The other hydrophilic and/or polar group is, preferably, a functional group corresponding to one of the following general formulae: $RSH$, $RCH_2Cl$, $RCH_2Br$, $RCH_2I$, $RCN$, $RNO_2$, $RCOCl$, $ROCBr$, $RSO_2Cl$, $RCOOH$, $RSO_3H$, $RCOO^-$, $RSO_3^-$, $ROR$,

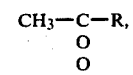

wherein R denotes a methyl, ethyl or propyl group. The organic amphiphilous compounds of Component C may contain an OH group and/or from 1 to 6, preferably 1 or 2, of these other functional groups.

The following are examples of Component C:

1. Alcohols, thioalcohols, phenols and thio phenols;: Methanol, ethanol, propanol, isopropanol, butanol, isobutanol, t-butyl alcohol and the isomeric pentanols, hexanols and heptanols, cyclohexanol, methylcyclohexanol, allyl alcohol, methallyl alcohol, cyclohexanomethanol, benzyl alcohol, butylmercaptan, phenols, e.g., phenol and the cresols, thiophenols and thiocresols; also alcohols with from 1 to 4 carbon atoms are preferred, particularly methanol.

2. Aldehydes:
Formaldehyde, acetaldehyde, propionaldehyde, butyl aldehyde, pentanals, hexanals, heptanals, octanols and their simple substitution products, semi-acetals and full acetals.

3. Carboxylic acids:
Formic acid, acetic acid, propionic acid, butyric acid, isobutyric acid, pentanoic acid, hexane carboxylic acid, heptane carboxylic acid, cyclohexane carboxylic acid, benzoic acid, toluic acid.

4. Carboxylic acid chlorides, carboxylic acid bromides, sulphonic chlorides; Acetyl chloride, propionic acid chloride, acetyl bromide, acid chlorides of $C_4$–$C_6$ monocarboxylic acids, but also methanesulphonic acid chloride, benzenesulphonic acid chloride, p-toluenesulphochloride, o-toluenesulphochloride, carbamic acid chlorides, e.g., t-butyl carbamic chloride, and phenylcarbamic chloride.

5. Esters:

Methyl acetate, ethyl acetate, propylacetate, butyl acetate, amyl acetate, the methyl and ethyl esters of propionic, butyric, pentanoic, hexanoic and heptanoic acid and the corresponding isomeric compounds, for example, isobutyric acid and 2,4,6-tribomophenylacetate.

6. Ethers and thioethers:

Methyl ethyl ether, cyclohexyl methyl ether, methyl butyl ether, phenol methyl ethyl, thiophenol methyl ether, cresol methyl ether, tetraydrofuranomethylmethyl ether.

7. Halomethyl compounds:

Ethyl chloride, ethyl bromide, ethyl iodide, n-propylchloride, n-propylbromide, n-propyliodide, isopropyl chloride, isopropyl bromide, isopropyl iodide, butyl chloride, butyl bromide, butyl iodide, $C_3$–$C_6$-halogenated methyl compounds, benzylhalides, e.g., benzylchloride or benzylbromide, hexahydrobenzyl halides, e.g., cyclohexanomethyl chloride, epichlorohydrin, 2-ethyl-2-chloromethyloxetane and 2-ethyl-2-chloromethyloxetane. Halogenated methyl compounds which contain from 4 to 7 carbon atoms are preferred.

8. Ketones:

Methyl ethyl ketone, methyl-isopropyl ketone, methylisobutyl ketone, methyl-isoamyl ketone, methyl-n-propylketone, methyl-n-butyl ketone, methyl-t-butyl ketone, methyl-furanyl ketone, methyl-tetrahydrofuranyl ketone, methylheptyl ketone, ethylhexyl ketone, acetophenone, w-chloroacetophenone and propiophenone.

9. Nitriles:

Acetonitrile, propionitrile, butyronitrile, tolunitrile, hexahydrobenzonitrile, acryllonitrile, allylnitrile, methyallynitrile, methacrylonitrile.

10. Nitro compounds:

Nitromethane, nitroethane, nitrohexane, nitrobenzene, chlorinated nitrobenzenes, nitrocyclohexanes, brominated nitrobenzenes, benzyl nitrate and nitrotoluene.

11. Sulphonic acids:

Methanesulphonic acid, ethanesulphonic acid, butanesulphonic acid, benzenesulphonic acid, 2-toluenesulphonic acid, 4-toluenesulphonic acid, chlorosulphonic esters and sulphonic acid esters, e.g., methanesulphonic acid, methyl ester, methane sulphonic acid ethyl ester and chlorosulphonic acid methyl ester.

The carboxyl acids and/or sulphonic acids may be partially or completely neutralized, for example, with alkali metal and alkaline earth metal hydroxides, e.g., sodium hydroxide, potassium hydroxide, barium hydroxide or magnesium hydroxide; or by the addition of amines, e.g., trimethylamine, triethylamine, methylmorpholine, pyridien, dimethylaniline or metal alcoholates, e.g., sodium-t-butanolate or potassium isopropanolate. Metal oxides, hydroxides or carbonates, either in the solid form or suspended in diluents may also be used for neutralization. Calcium oxide, magnesium oxide, calcium carbonate, magnesium carbonate and dolomite, for example, are particularly suitable. Tertiary amines are useful in this neutralization, e.g., alkoxylated products of primary and secondary amines, and also polyesters or polyacrylates which contain tertiary nitrogen atoms as well as the known condensation products based on epichlorohydrin and polyamines.

12. Components C, according to this invention, may also comprise compounds which contain phosphorus, for example, trimethyl phosphite, trimethylphosphates, triethylphosphite, triethylphosphate, diethylphosphite, diethylphosphate, dimethylphosphite, dimethylphosphate, thiophosphoric acid-O, O-dimethylester, thisphosphoric acid trimethylester, or thiophosphoric acid-O, O-dimethylester chloride.

13. Lignin:

Calcium lignosulfonate, lignosulfonic acid sodium salts, lignosulfonic acid, lignin sulfate produced by the alkali process (Kraft's process) and, particularly, de-sulfonated lignin.

Component D

Component D contains the curing agent and/or activators. The following are examples of Component D:

1. Water

2. Water containing 10% to 70% by weight of an alkali metal silicate, such as sodium and/or potassium silicate. Crude commercial alkali metal silicate may contain other substances, e.g., calcium silicate, magnesium silicate, borates or aluminates and may also be used. The molar ratio of $Ml_2OSiO_2$ (M1=metal) is not critical and may vary within the usual limits, but is, preferably, between 4 to 1 and 0.2 to 1.

3. Water containing 20% to 50% by weight of ammonium silicate.

4. Water containing 5% to 40% by weight of magnesium oxide in the form of a colloidal dispersion.

5. Alkali metal metasilicate pentahydrate such as sodium, commercial dry granular sodium, potassium silicate and potassium metasilicate pentahydrate.

6. Water containing 20% to 70% by weight of silica sol.

7. Water containing 0.001% to 10% by weight of an activator (catalyst) such as:

(a) tertiary amines, e.g., triethylamine, tributylamine, N-methyl-morpholine, N-ethyl-morpholine, N-cocomorpholine, N,N,N',N-tetramethylethylenediamine, 1,4-diazo-bicyclo-(2,2,2)-octane, N-methylmethyl-N'-dimethylaminoethyl piperazine, N,N-dimethylbenzylamine, bis (N,N-diethylaminoethyl)-adipate, N,N-diethylbenzylamine, pentamethyldiethylenetriamine, N,N-dimethylcyclohexylamine, N,N-dimethylcyclohexylamine, N,N,N',N'-tetramethyl-1,3-butanediamine, N,N-dimethylbeta-phenylethylamine and 1,2-dimethylimidazole. Suitable tertiary amine activators which contain hydrogen atoms which are reactive with isocyanate groups include, e.g., triethanolamine, triisopanolamine, N,N,N',N'-dimethylethanolamine, N-methyldiethanolamine, N-ethyldiethanolamine and their reaction products with alkylene oxides, e.g., propylene oxide and/or ethylene oxide.

(b) Organo-metallic compounds, preferably organotin compounds such as tin salts of carboxylic acids, e.g., tin acetate, tin octoate, tin ethyl hexoate, tin laurate and the dialkyl tin salts of carboxylic acids, e.g., dibutyl tin diacetate, dibutyl tin dilaurate, dibutyl tin maleate or diocyl tin diacetate.

(c) Silaamines with carbon-silicon bonds as described, e.g., in British Pat. No. 1,090,589, may also be used as activators, e.g., 2,2,4-trimethyl-2-silamorpholine or 1,3-diethylaminomethyl-tetramethyldisiloxane.

(d) Other examples of catalysts which may be used according to the invention and details of their action are described in Kunststoff-Handbuch, Volume VII, published by Vieweg and Hochtlen, Carl-Hanser-Verlag, Munich, 1966, on pages 96 and 102.

8. 0.001% to 10% by weight, based on the reaction mixture, of an activator (catalyst) listed above.

9. Water containing 20% to 70% by weight of a water-binding agent which is capable of absorbing water to form a solid or a gel, such as hydraulic cement, synthetic anhydrite, gypsum or burnt line.

10. Water containing 1% to 10% by weight of bases which contain nitrogen such as tetraalkyl ammonium hydroxides.

11. Water containing 1% to 10% by weight of alkali metal hydroxides such as sodium hydroxide, alkali metal phenolates such as sodium phenolate or alkali metal alcoholates such as sodium methylate.

12. Water containing sodium polysulfide in the amount of 1% to 10% by weight.

Surface-active additives (emulsifiers and foam stabilizers) may also be used, according to the invention. Suitable emulsifiers are, e.g., in the sodium salts of ricinoleic sulphonates or of fatty acids or salts of fatty acids with amines, e.g., oleic acid diethylamine or stearic acid diethanolamine. Other surface-active additives are alkali metal or ammonium salts of sulphonic acids, e.g., dodecyclbenzene sulphonic acid or dinaphthyl methane disulphonic acid; or of fatty acids, e.g., ricinoleic acid; or of polymeric fatty acids.

The foam stabilizers used are mainly water-soluble polyester siloxanes. These compounds generally have a polydimethylsilioxane group attached to a copolymer of ethylene oxide and propylene oxide. Form stabilizers of this kind have been described, e.g., in U.S. Pat. No. 3,629,308. These additives are preferably used in quantities of from 0% to 20% by weight, based on the reaction mixture.

Negative catalysts, for example, substances which are acidic in reaction, e.g., hydrochloric acid or organic acid halides, known cell regulators, e.g., paraffins, fatty alcohols or dimethyl polysiloxanes, pigments or dyes, known flame retarding agents, e.g., tris-chloroethylphosphate or ammonium phosphate and polyphosphates, stabilizers against aging and weathering, plasticizers, fungicidal and bacteriocidal substances and fillers, e.g., barium sulphate, kieselguhr, carbon black or whiting, may also be used, according to the invention.

Further examples of surface-active additives, foam stabilizers, cell regulators, negative catalysts, stabilizers, flame-retarding substances, plasticizers, dyes, filler, fungicidal and bacteriocidal substances; details about methods of using these additives, and about their action, may be found in Kunststoff-Handbuch, Volume VI, published by Vieweg and Hochtlen, Carl-Hanser-Verlag, Munich, 1966, on pages 103 to 113. The halogenated paraffins and inorganic salts of phosphoric acid are the preferred fire-retardant agents.

According to the invention, it has been further found that it is favorable to carry out the reaction in the additional presence of a compound acting as hardening agent and lowering the pH of the reaction mixture.

Suitable compounds of this type include, depending on the reaction mixture employed, ammonium chloride, barium chloride, barium nitrate, bleaching earths, disodium phosphate, calcium-magnesium carbonate, calcium bromide, calcium chloride, calcium iodate, potash alum, potassium fluoride, potassium borofluoride, potassium bromide, potassium carbonate, potassium, metabisulfite, potassium silicofluoride, magnesium carbonate, magnesium fluoride, magnesium oxide, magnesium phosphate, monoammonium phosphate, monosodium phosphate, sodium antimonate, sodium acetate, sodium bichromate, sodium bifluoride, sodium bisulfate, sodium bromide, sodium fluoride, sodium hexametaphosphate, tetrapotassium pyrophosphate, zinc acetate, zinc carbonate and boric acid. The hardening agent may be added to Components C or D in an amount sufficient to lower the pH to 7 to 8.

SUMMARY OF THE INVENTION

I have discovered that an alkali metal cellulose silicate condensation product, an organic polyisocyanate and an amphiphilous organic compound will react chemically to produce a polyisocyanate silicate plastic product.

The preferred method is to react a polyisocyanate and/or isocyanate-terminated polyurethane prepolymer of Component B with an alkali metal cellulose silicate polymer of Component A to produce a polyisocyanate silicate prepolymer and/or polyurethane silicate prepolymer which is then reacted with an organic compound (or mixture thereof) of Component C, and optionally, a curing agent and/or an activator of Component D to produce a polyisocyanate organic silicate solid or cellular solid product.

The proportion, by weight, of Component D when used with Component B is preferably from 1:70 to 80:20, and the quantity of Component C is from 1% to 30% by weight, preferably from 2% to 20% by weight, based on Component B. The proportion is 2 parts by weight of Component A to 1 to 10 parts by weight of Component B. An excess of oxidated silicon compound may be used in the production of Component A and used as a filler.

In an alternate method, the Components A, B, C and, optionally, D, are added simultaneously and mixed homogeneously, and in a short period of time (a few seconds to about 10 minutes), the chemical reaction begins and a solid or cellular solid product is produced.

In another alternate method, the Components A, B, C and a polyol are added simultaneously and mixed homogeneously and within a few second to 10 minutes, the mixture reacts chemically to produce a solid or cellular solid product.

The polyisocyanage may be first reacted with an oxidated silicon compound to produce a polyisocyanate prepolymer which is then reacted with Components A, C and, optionally, D, to produce a solid or cellular solid product.

Mixtures which contain more than 30% by weight of water are usually soft, solid products which may be used as putties, surface coatings, adhesive bonds, grouting compositions, caulking compositions and may be used for producing foams by adding a blowing agent. The blowing agents are usually inert liquids with boiling points ranging from −25° C. to 80° C.

The blowing agents used may be, e.g., acetone, ethyl acetate, methanol, ethanol, halogenated alkanes, e.g., methylene chloride, chloroform, ethylidene chloride, vinylidene chloride, monofluorotrichloromethane, chlorodifluoromethane, dichlorodifluoromethane, butane, hexane, heptane or diethyl ether. Compounds decompose at temperature above room temperature with liberation of gases, e.g., nitrogen, such as azo compounds, azoisobutyric acid nitrile, may also act as blowing agents. Other examples of blowing agents and details about the use of blowing agents are described in Kunststoff-Handbuck, Volume VII, published by Vieweg and Hochtlen, Carl-Hanser-Verlag, Munich 1966, on pages 108 and 109, 453 to 455 and 507 to 510.

The proportions of the components may be adjusted to obtain the desired product, ranging from a solid to a highly cellular solid. When water is used, it reacts with the NCO group to produce $CO_2$ and pores are produced in the product by the evolved $CO_2$. In certain cases, the $CO_2$ is rapidly evolved and escapes before the product hardens so that a solid product can be produced nearly completely free of air cells. The hardening times generally increase with decreasing proportions of Component C.

Powdered calcium, magnesium, aluminum or zinc may be used and will react with the alkali metal ions to bring about the evolution of hydrogen which acts as a blowing agent. Compressed gases such as air, nitrogen, methane, etc., may be mixed in the components and may also be used to mix components, then be used as the blowing agent. These metal powders also have a hardening and reinforcing effect.

The properties of the foams (cellular solids) obtained from any given formulation, e.g., their density in the moist state, depends, to some extent, on the details of the mixing process, e.g, the form and speed of the stirrer and the form of the mixing chamber, and also the selected temperature at which foaming is started. The forms will usually expand from 3 to 12 times their original volume.

The products produced by the invention have been uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling and moisture-proofing coating. The foaming material may also be forced, poured or injection-molded into cold or heated molds which may be relief molds, or solid or hollow molds, optionally by centrifugal casting, and left to harden at room temperature or at temperatures up to 200° C., optionally under pressure. In certain cases, it may be necessary to heat the mixing or spraying apparatus in order to initiate foaming; then once foaming has started, the heat evolved by the reaction between components continues the foaming until the reaction is complete. A temperature between 40° C. to 150° C. may be required to initiate foaming.

Reinforcement elements may be incorporated into the reaction mixtures. The inorganic and/or organic reinforcing elements may be, e.g., fibers, metal wires, foams, fabrics, fleeces or skeletons. The reinforcing element may be mixed with the reaction mixtures, for example, by the fibrous web impregnation or by processes in which the reaction mixtures and reinforcing fibers are together applied to the mold, for example, by means of a spray apparatus. The shaped products obtainanble in this way may be used as building elements, e.g., in the from of sandwich elements, either as such or after they have been laminated with metal, glass or plastics; if desired, these sandwich elements may be foamed. The products may be used as hollow bodies, e.g., as containers for goods which may be required to be kept moist or cool, as filter materials or exchanges. as ctaalyst carriers or carriers of other active substances, as decorative elements, furniture components are fillings for cavities. They may be used in the field of model building and mold building; also the production of molds for metal casting may be considered.

According to the preferred method of carrying out the process, the blowing agent may be added to Component A, B or C and the emulsifier added to Component A, C or D. Instead of blowing agents, finely divided inorganic or organic hallow particles, e.g., hollow expened beads of glass, plastic and star may be used for producing cullular solid poducts. These products may be used as thermal-or sound-insulating materials, cavity fillings, packaging materials, building materials which have good solvent resistance and advantageous fire characteristics. They may also be used as light-weight building bricks in the form of sandwiches, e.g., with meta-covering layers for house building and the construction of motor vehicles aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or of other polymers, e.g., polysulphone, polyepoxide, polyurethane, polyurethane silicate, urea-formaldehyde, formaldehyde-urea silicate, phenol-formaldehyde, formaldehyde-phenol silicate, or polyimide polymers, or, alternatively, heaps of these particles may be permeated with foaming reaction mixtures to produce insulating materials which have good fire-resistant characteristics.

The cellular solid products of the invention, in the aqueous or dry or impregnated state, may subsequently be lacquered, metallized, coated, laminated, galvanized, vapor treated, bonded or blocked. The cellular solid products may be sawed, drilled, planed, polished or changed by other working processes to produce shaped products. The shaped products, with or without fillers, may be further modified in their properties by subsequent heat treatment, oxidation processes, hot pressing, sintering processes or surface melting or other compacting processes.

The novel cellular solid products of the invention are also suitable for use as constructional materials, due to their toughness and stiffness, yet they are still elastic. They are resistant to tension and compression, have a high dimensional stability to heat and high flame resistance. They have excellent sound-absorption capacity, heat-insulating capacity, fire resistance and heat resistance, which makes them useful for insulation. The cellular products of this invention may be foamed on the building site and in many cases may be used in place of wood or hard fiber boards. The brittle foams may be crushed and used as a filler, as a soil conditioner and as a substrate for the propagation of seedlings, cuttings and plants or cut flowers.

Suitable water-binding agents may be used in this invention, such as hydraulic cement, gypsum, synthetic anhydrites and burnt lime. Hydraulic cements such as Portland cement, quick-setting cement, mortar cement, blast-furnace Portland cement, sulphate-resistant cement, brick cement, mild-burnt cement, natural cement, lime cement, gypsum cement, calcium sulfate cement, pozzolan cement, etc., contain oxidated silicon compounds and may be used in this invention. Hydrated silicate is the preferred oxidated silicon compound.

There are many different kinds of cement which may be used; in general, any mixture of the following may be used; fine ground lime, alumina and silica that will set to a hard product by admixture of water which combines chemically with the other ingredients to form a hydrate. Detailed descriptions of the many kinds of cement which react with sand and rocks to produce concrete may be found in "Encyclopedia of Chemical Technology", Volume 4, Second Edition, Published by Kirk-Othmer, pages 684–710, as well as in other well known references in this field.

A water-binding component such as hydraulic cement, synthetic anhydrides, gypsum or burnt lime may be added to any of the components, or may be mixed simmultaneously with Components A, B, C and D, to produce a tough, somewhat flexible solid or cellular solid concrete. This mixture may be used as surface coating having good adhesion and resistance-to-abrasion properties, as mortars, for making molded products, particularly in construction engineering and civil engineering as for building walls, igloos, boats, etc., and for road building. These products are light weight, thermal-insulating materials with excellent mechanical properties and fire resistance. It is preferable that the polyisocyanate of Component B is an isocyanate-terminated polyurethane prepolymer or that a polyol is added in Component A, C or D in the ratio of 1 to 50 mols of the polyol to 50 to 99 mols of the polyisocyanate. Good polyisocyanate silicate plastic concrete products can be obtained without using polyurethane prepolymers or polyols. The amount of water-binding component used varies greatly, depending on the type of product desired, from 0% to 100% by weight, based on the weight of Components A, B and C. In certain cases, it is desirable to add sand and gravel in the amount of 1 to 6 parts by weight to each part by weight of the hydraulic cement used in the invention. The mixture may be poured in place, troweled on or sprayed onto the desired surface, to produce a solid or cellular solid product.

Fillers in the form of powders, granules, wire, fibers, dumb-bell-shaped particles, crystallites, spirals, rods, beads, hollow beads, foam particles, non-woven webs, pieces of woven or knitted fabrics, tapes and pieces of foil made of solid inorganic or organic substances, e.g., dolomite, chalk, alumina, asbestos, basic silicic acids, sand, talc, iron oxide, aluminum oxide and hydroxides, alkali metal silicates, zeolites, mixed silicates, calcium silicates, calcium sulphates, alumino silicates, cements, basalt wool or powder, glass fibers, carbon fibers, graphite, carbon black, Al, Fe, Cu and Ag powders, molybdenum sulphide, steel wool, bronze or copper meshes, silicon powder expanded clay particles, hollow glass beads, glass powder, lava and pumice particles, wood chips, woodmeal, cork, straw, popcorn, coke or particles of filled or unfilled, foamed or unfoamed, stretched or unstretched organic polymers, may be added to the mixture of the Components A, B, C and D in many applications. Among the numerous organic polymers which may be used as fillers, the following may be mentioned as examples; polystyrene, polyethylene, polypropylene, polyacrylonitrile, polybutadiene, polyisoprene, polytetrafluorethylene, aliphatic and aromatic polyesters, malamine, urea, phenol resins, polyacetal resins, polyepoxides, polyhydantoins, polyureas, polyethers, polyurethanes, polyimides, polyamides, polysulphones, polycarbonates and copolymers, thereof.

The composite materials, according to the invention, may be mixed with considerable quantities of fillers without losing their advantageous properties. In particular, composite materials which consist predominantly of inorganic constituents are preferably filled with inorganic fillers; where silicate constituent predominate, they are preferably filled with organic fillers. Fillers which are particularly preferred are chalk, talc, dolomite, gypsum, clay, anhydrite, glass, carbon and the conventional plastics and rubber waste.

In the production of surface coatings, bonds, putties, or interlayers, particularly in the case of porous materials, it is preferred to use polyisocyanates which have only a low isocyanate content, e.g., less than 5%, or prepolymers which are free of isocyanate groups. The mixtures obtained in this way have a long pot life and may be applied in thin layers which gradually harden in the course of time. The liberated $CO_2$ acts as the curing agent. In a two-stage or multistage hardening which results when an excess of water is used, there is a rapid evolution of $CO_2$ and the polyisocyanate organic silicate-solid product is converted into a plastic or thermoplastic, workable form which may be used as putties, coating agents, grouting materials or mortar. This thermoplastic form may also be injection molded, extruded or worked-up in a kneader.

In many cases, the polyisocyanate organic silicate solid/cellular solid products produced by the invention are soluble in organic solvents and may be used as a tough coating agent for wood and metals. The mixtures of the invention are also suitable for use as impregnating agents for finishing fibers. The mixtures may also be extruded through dies or slots and converted into fibers and foils. These fibers and foils may be used for producing a synthetic incombustible paper of fleeces.

The object of the present invention is to provide a novel method of producing polyisocyanate silicate solid/cellular solid products. Another object is to produce novel polyisocyanate organic silicate solid/cellular solid products which are relatively low in cost. Still another object is to produce novel fine cellular solid products of relatively low cost, rigid, light weight, high-strength, having good flame resistance and dimensional stability when heated. Another object is to produce solid cellular solid products that may be used for thermal insulating, structural purposes, sound proofing, shock-resistant packaging, cushions, coating for wood and metals, adhesives, casting material, putty, etc.

DESCRIPTION OF PREFERRED EMBODIMENTS

My invention will be illustrated in greater detail by the specific examples which follow, it being understood that these preferred embodiments are illustrative of, but not limited to, procedures which may be used in the production of polyisocyanate organic silicate solid/cellular solid products. Parts and percentages are by weight unless otherwise indicated.

EXAMPLE 1

About 2 parts by weight of fir sawdust and 2 parts by weight of sodium hydroxide flakes are mixed with the listed fine granular oxidated silicon compound, then heated to 150° C. to 220° C. while agitating at ambient pressure for 5 to 60 minutes or until the mixture softens and expands into a brown, thick liquid which solidifies on cooling, thereby producing a sodium cellulose silicate condensation product.

| Example | Oxidated Silicon Compound | Parts by Weight |
|---------|--------------------------|-----------------|
| a | Hydrated silica | 1 |
| b | Sodium silicate | 0.5 |
| c | Silica | 0.5 |
| d | Silicoformic acid | 1 |

EXAMPLE 2

About 2 parts by weight of small plant particles listed below, 4 parts by weight of sodium hydroxide and 1.5 parts by weight of hydrated silica are mixed, then heated tp 150° C. to 220° C. while agitating at ambient pressure, with care being taken to avoid burning the mixture, for 5 to 60 minutes; the mixture begins to expand and a brown, thick liquid, sodium cellulose silicate condensation product, is produced. The liquid solidifies on cooling and is ground into a powder. The powder is soluble in water, alcohols, polyhydric organic compounds and other solvents.

| (a) | oak sawdust | (g) | cotton stalks |
|-----|-------------|-----|---------------|
| (b) | fir sawdust | (h) | bagasse |
| (c) | ash sawdust | (i) | Paper |
| (d) | seaweed | (j) | oat straw |
| (e) | cotton | (k) | grass clippings |
| (f) | corn cobs | | |

EXAMPLE 3

About 2 parts by weight of an alkali metal cellulose silicate condensation product as produced in Example 1a and in the form of a powder are mixed with 2 parts by weight of tolylene diisocyanate (TDI), then agitated for 10 to 60 minutes at a temperature between 20° C. to 70° C., thereby producing a polyisocyanate alkali metal cellulose silicate prepolymer. About 1 part by weight of methanol containing 10% by weight of triethylene amine is thoroughly mixed with the prepolymer. The mixture expands 3 to 8 times its original volume, thereby producing a rigid cellular solid polyurethane silicate plastic product.

Other alkali metal cellulose silicate condensation products may be used in place of that produced in Example 1a, such as 1b, 1c, 1d, 2a, 2b, 2c, 2d, 2e, 2f, 2g, 2h, 2i, 2j and 2k.

EXAMPLE 4

Example 3 is modified wherein 1 part by weight of a polyol is added to the methanol, then mixed with the alkali metal cellulose silicate prepolymer.

The polymer is selected from the list below:

| Example | Polyol | Type of Product |
|---------|--------|-----------------|
| a | Polyethylene glycol (mol. wt. 380) | Semi-rigid foam |
| b | Polyethylene glycol (mol. wt. 1000) | Semi-rigid foam |
| c | Polypropylene glycol (mol. wt. 600) | Semi-rigid foam |
| d | POLY-G 20-112 produced by Olin Chemicals (polyethylene polyether diol) | Semi-rigid foam |
| e | POLY-G 71-357 produced by Olin Chemicals (amine sucrose polyol) | Rigid foam |
| f | POLY-G 30-56 produced by Olin Chemicals (polyethylene polyester triol) | Semi-rigid foam |
| g | Castor oil | Semi-rigid foam |

EXAMPLE 5

About 2 parts by weight of the alkali metal cellulose silicate condensation product in the form of a powder as produced in Example 2b, 2 parts by weight of "PAPI" a MDI produced by Upjohn, and 1 part by weight of the various organic chemicals listed below are simultaneously mixed, thereby producing a rigid polyurethane silicate cellular products.

| (a) | ethanol | (h) | phenol |
|-----|---------|-----|--------|
| (b) | propanol | (i) | cresol |
| (c) | isopropanol | (j) | acetaldehyde |
| (d) | allyl alcohol | (k) | furfuraldehyde |
| (e) | acetic acid | (l) | acetonitrile |
| (f) | propionic acid | (m) | 4-toluene sulphonic acid |
| (g) | benzoic acid | (n) | propionic acid chloride |

EXAMPLE 6

About 2 parts by weight of the alkali metal cellulose silicate condensation product as produced in Example 2a in the form of a powder and 3 parts by weight of MDI are mixed, then agitated from 10 to 60 minutes at a temperature between 20° to 70° C., thereby producing a polyisocyanate alkali metal cellulose silicate prepolymer. About 1 part by weight of epichlorohydrin, containing 10% by weight of triethylamine, is thoroughly mixed with the prepolymer and in a few seconds, the mixture begins to expand and produces a cellular solid polyurethane silicate plastic.

Other organic compounds may be used in place of epichlorohydrin, such as 2-ethyl-2 chloromethyl-oxetane, acetone, ethanol, isopropanol, allyl alcohol, thiophenol, furfural, ethyl acetate, cyclohexyl methyl ether, ethyl chloride, benzyl chloride, propionitrile, acrylonitrile, nitroethane and mixtures thereof.

EXAMPLE 7

Example 6 is modified by adding 0.5 part by weight of a blowing agent, trichlorofluoromethane, to the polyisocyanate alkali metal cellulose silicate prepolymer.

Other blowing agents may be used in place of trichlorofluoromethane, such as butane, dichlorodifluoromethane, isobutylene, vinyl chloride and compressed air or nitrogen.

EXAMPLE 8

The alkali metal cellulose silicates as produced in Example 1d and 1e are equally mixed, then 2 parts by weight of the mixture are added to 2 parts by weight of epichlorohydrin containing 10% triethylenediamine and thoroughly mixed, then 2 parts by weight of a 20% solution of a distillation residue of the distillation of commercial tolylene diisocyanate in a crude phosgenation product of an aniline-formaldehyde condensation with an NCO content of about 30% are thoroughly and rapidly mixed. The mixture begins to expand in a few second, thereby producing a rigid cellular solid polyurethane silicate plastic.

EXAMPLE 9

About 2 parts by weight of the alkali metal cellulose silicate as produced by Example 1b and 4 parts by weight of an isocyanate-terminated polyurethane prepolymer, listed below, are thoroughly mixed, then agitated to 10 to 60 minutes at a temperature between 20° C. to 70° C., thereby producing a polyurethane alkali metal cellulose silicate prepolymer. One part by weight of acetic acid is added to the prepolymer and rapidly mixed. The mixture begins to expand in a few seconds to produce a cellular solid polyurethane silicate plastic.

| Example | Isocyanate-terminated Polyurethane Prepolymer |
|---|---|
| a | ISONATE 181 produced by Upjohn (polymeric MDI) |
| b | ISONATE 143L produced by Upjohn (polymeric MDI) |
| c | FASTCAST ARPO A produced by Arnco (MDI prepolymer) |
| d | toluene diisocyanate with polypropylene glycol (mol. wt. 500) in an NCO/OH ratio of 25:1 |
| e | diisocyanatediphenylmethane with a tetrafunctional polypropylene glycol (mol. wt. 500) to produce a prepolymer having about 22% NCO groups |
| f | toluene diisocyanate with castor oil to produce a prepolymer with an NCO content of about 15% |
| g | toluene diisocyanate with a hydroxyl-group-containing polysulfide polymer to produce a prepolymer with an NCO content of about 12% |
| h | methylene bis-phenyl diisocyanate with a liquid polyepichlorohydrin to produce a prepolymer of about 16% and 25% by weigh of a resin extender, polyalpha-methyl-styrene are added, percentage based on weight of prepolymer. |
| i | tolylene diisocyanate with a polyester (4 mols of glycerol, 2.5 mols of adipic acid and 0.5 mol of phthalic anhydride) to produce a prepolymer with an NCO content of about 23% |
| j | tolylene diisocyanate with polyethylene (mol. wt. 2000) to produce a prepolymer with an NCO content of about 28% |

EXAMPLE 10

Component A: 1 part by weight of the alkali metal cellulose silicate as produced in Example 1a;
Component B: 2 part by weight of MDI;
Component C: 1 part by weight of ethylene chloride;
Activator: 0.1 part by weight of triethanolamine;
Emulsifier: 0.1 part by weight of sodium salt of a fatty acid;
Filler: 0.2 part by weight of 0.5 cm. glass fibers;
Hardener: 0.2 part by weight of ammonium chloride;
Foam Stabilizer: 0.2 part by weight of a polymethylsiloxane silicate reacted with propylene oxide as produced by the process in U.S. Pat. No. 4,020,937;
Polyol: 0.5 part by weight of polyethylene glycol (mol. wt. 600), Components A, B, C, activator, emulsifier, hardener, filler and foam stabilizer are simultaneously and rapidly admixed and the mixture begins to expand in a few seconds to produce a cellular solid polyurethane silicate plastic.

EXAMPLE 11

Component A: 3 parts by weight of the alkali metal cellulose silicate as produced in Example 1d;
Component B: 3 parts by weight of PAPI 27 by Upjohn;
Component C: 1 part by weight of epichlorohydrin;
Activator: 0.1 part by weight of triethylenediamine (DABCO 33LV by Air Products);
Component D: 0.5 part by weight of water containing 25% sodium silicate;
Emulsifier: 0.1 part by weight of the sodium salt of lignosulfonic acid;
Water-binding Agent: 3 parts by weight of Portland cement;
Blowing Agent: 0.4 part by weight of methylene chloride.

Components A, C, and D, activator, emulsifier, water-binding agent and blowing agent are thoroughly mixed, then Component B is thoroughly admixed and in a few seconds, the mixture begins to expand and hardens into a cellular solid polyurethane silicate plastic.

Other water-binding agents may be used in place of Portland cement, such as gypsum, burnt lime and synthetic anhydrite.

EXAMPLE 12

Component A: 2 parts by weight of the alkali metal cellulose silicate as produced in Example 2i;
Component B: 2 parts by weight of "Crude MDI", (polyphenyl-polymethylene-isocyanates obtained by anilineformaldehyde condensation followed by phosgenation);
Component C: 0.2 part by weight of chlorohydrin;
Activator: 0.1 part by weight of triethylamine;
Water-binding Agent: 5 parts by weight of Portland cement;
Polyol: 1 part by weight of POLY-G 71-357 produced by Olin Chemicals (a surcose amine polyol)

Components A, B and C, activator, water-binding agent and polyol are admixed substantially simultaneously and in a short period of time, the mixture begins to expand to produce a tough rigid cellular solid polyurethane silicate plastic. Component D, water, is then added in sufficient amount to wet the foam, thereby curing the unreacted Portland cement.

EXAMPLE 13

Component A: 1 part by weight of alkali metal cellulose silicate as produced in Example 2f;
Component B: 3 parts by weight of MDI;
Component C: 0.5 part by weight of chloroform;
Component D: 1 part by weight of water;
Activator: 0.1 part by weight of triethylenediamine;
Hardener: 0.2 part by weight of monoammonium phosphate.

Components A, C and D, the activator and hardener are mixed and Component A goies into solution; then Component B is added and rapidly and thoroughly mixed. The mixture expands in a few seconds, to produce a rigid cellular solid polyurethane silicate plastic.

EXAMPLE 14

Component A: 2 parts by weight of alkali metal silicate as produced in Example 2i;
Component B: 2 parts by weight of MDI (PAPI 27 produced by Upjohn);
Component C: 0.5 parts by weight of acrylonitrile;
Polyol: 1 part by weight of a surcose amine polyol (POLY-G 71-530 produced by Olin);
Blowing Agent; trichlorotrifluoroethane.

Components A, C, the polyol and blowing agent are mixed to form a thick solution which is then rapidly the thoroughly mixed with Component B at 24° C. The mixture is then poured into a mold of a 2″×4′×8′ insulation panel to a depth of about ¼″ and in about 15–30 seconds the mixture begins to expand. It expands to fill the mold and hardens within 5 minutes. The insulation panel may be used for roof insulation, cores of doors, may be covered with paneling and used for walls.

EXAMPLE 15

Component A: 2 parts by weight of alkali metal cellulose produced by mixing equal parts by weight of dry fir sawdust, sodium hydroxide flakes and dry granular silicic acid gel then heating the mixture at 150° C. to 220° C. while agitating for about 5 to 10 minutes:
Component B: 3 parts by weight of TDI;
Component C: 0.5 parts by weight of acetone 0.25 parts by weight of butyric acid.
Activator: 0.1 part by weight of triethanolamine 0.01 part by weight of cobalt naphthenate;
Polyol: 0.5 part by weight of polypropylene glycol (mol. wt. 1200).

Components A, B and C and activator and polyol are mixed to a solution then rapidly and thoroughly mixed with Component B at 24°. The mixture is then poured into a mold 4′×8′ square. The mixture begins to expand in 15 to 30 seconds and expands within 45 to 100 seconds. The foam hardens within 5 minutes. The foam slab is then cut in varying thickness to be used as thermal and sound insulation, as cores in doors, as wall or roof insulation, metal or plastic may be glued to the foamed sheets and used as construction panels or siding.

EXAMPLE 16

Component A: 1 part by weight of the broken down alkali metal seaweed particle silicate polymer as produced in Example 2d; 1 part by weight of the broken down alkali metal oak sawdust silicate polymer as produced in Example 2a; 1 part by weight of the broken down alkali metal cellulose-silicate polymer as produced in Example 2i;
Component B: 4 parts by weight of MDI;
Component C: 0.5 parts by weight of acetic acid; 0.5 parts by weight of nitrobenzene; 0.5 parts by weight of butyl acetate;
Activator: 1 part by weight of a 10% solution of triethylamine in propylene glycol;
Emulsifier: 0.1 part by weight of sodium docytl sulfosuccinate.

Components A and C, activator and emulsifier are mixed then the mixture is thoroughly mixed with Component B then poured into a mold of an art object. The mixture expands about 6 times its original volume to fill the mold and is cured within 5 to 10 minutes to produce a rigid useful art object.

EXAMPLE 17

Component A: 3 parts by weight of the broken down ash particle as produced in Example 2C;
Component B: 3 parts by weight of polymeric polymethylene polyphenylisocyanate;
Component C: 0.5 parts by weight of isopropyl alcohol; 0.5 parts by weight of 2-toluene-sulphonic acid; 0.25 parts by weight of triethylphosphate;
Activator: 0.1 parts by weight of a 10% solution of triethanolamine in glycerol;
Blowing Agent; trichlorotrifluoroethane.

Components A and C, activator and blowing agent are mixed then the mixture is mixed with Component B rapidly thoroughly. The mixture is then poured into the bottom of the hull of a sailboat. The mixture expands 10 to 15 times its original volume then hardens in 5 to 10 minutes into a tough rigid foam which is used for strengthening and floatation.

EXAMPLE 18

Component A: 2 parts by weight of the broken down alkali metal fir sawdust-silicate polymer as produced in Example 10 is added to 3 parts by weight of water to produce a solution;
Component B: 4 parts by weight of a 25% solution of a distillation residue of the distillation of commercial tolylene diisocyanate in a crude phosgenation product of an aniline-formaldehyde condensate with a NCO content of about 26% by weight.
Component C: 0.2 parts by weight of methanol; 0.2 parts by weight of lignin sulfate
Emulsifier: 0.1 part by weight sodium salt of lignosulfonic acid;
Activator: 0.1 part by weight of triethylamine
Blowing Agent; 0.5 part by weight of trichlorofluoromethane.

Component A and C, emulsifier and activator are mixed. Component B and blowing agent are mixed then the two mixtures are vigorously mixed together for about 15 seconds with a high speed stirrer. The mixture is then poured into a mold where it begins foaming in about 40 to 60 seconds. It expands 10 to 20 times its original volume to produce a hard, rigid, medium-coarse cell structure of about 2 to 2.5 lbs. per cubic feet. The rigid foam is then cut into sheets and used for construction panels, insulating sheets, etc. The foam sheet has excellent fire resistance and insulation qualities.

EXAMPLE 19

Component A: 4 parts by weight of an aqueous solution containing 1 part by weight of the broken down alkali metal cellulose-silicate as produced in Example 2i and 1 part by weight of the broken down alkali metal corn cob-silicate polymer as produced in Example 2f;
Component B: 3 parts by weight of a polyurethane prepolymer produced by mixing 9 parts by weight of a commercial-grade of 4,4′-diphenylmethane and 1 part by weight of a trimethylol propane-initiated polyethylene glycol with an OH-number of 250; NCO content of about 25%;
Component C: 0.5 parts by weight of phenol;
Activator: 0.2 parts by weight of triethylamine;
Blowing Agent: 1 part by weight of monofluorotrichloromethane.

Components A and C and activator are mixed then Component B and blowing agent are mixed. The two mixtures are mixed at 35° C. then rapidly agitated for about 15 seconds then poured into a mold and the mixture expands into a white foam. The foam hardens within 1 minute into a hard rigid, high flexural elasticity, heat stable, flame resistant.

EXAMPLE 20

Component A: 4 parts by weight of an aqueous solution containing 1 part by weight of the broken down alkali metal fir sawdust-silicate polymer as produced in Example 1a and 0.5 parts by weight of the broken down alkali cellulose-silicate polymer as produced in Example 2e;
Component B: 3 parts by weight of a 30% solution of TDI residue (containing 15% by weight NCO) in 4,4-diphenylmethane diisocyanate (MDI with NCO content of 30%);
Component C: 0.2 parts by weight 4-toluenesulfonic acid; 0.1 par by weight of trichlorobutylene oxide;
Activator: 0.1 part by weight of triethylamine;
Blowing Agent: 1 part by weight of trichlorotrifluorethane;
Water Binding Agent: 4 parts by weight of Portland Cement.

Components A and C and activator are mixed. Component B, blowing agent and water-binding agent are mixed. The two mixtures are then thoroughly mixed for about 10 seconds then poured into a concrete block mold (4"33 6"×16") to a depth of about ½". The mixture rapidly expands to fill the mold and solidfes within 1 to 2 minutes thereby producing a uniform foam concrete which has excellent flame resistance, is strong and has excellent insulation properties. The foamed concrete block may be used to build walls in construction.

EXAMPLE 21

Example 19 is modified by adding 3 parts by weight with Component B thereby producing a hard rigid polyurethane silicate concrete foam.

EXAMPLE 22

Ten part by weight of the alkali metal broken down fir sawdust-silicate as produced in Example 1a, 1 part by weight of allyl alcohol, 0.5 parts by weight of acetyl chloride, 0.5 parts by weight of acetone, 5 parts by weight of Portland cement, 2 parts by weight of burnt lime and 8 parts by weight of an amine sucrose polyol (POLY-G 71-357 as produced by Olin), are mixed then thoroughly mixed with a mixture containing 10 parts by weight of MDI, 3 parts by weight of TDI residue (NCO-15%), 3 parts by weight of trichlorotrifluoroethane, 5 parts by weight of Portland cement and 5 parts by weight of sand then the mixture is poured into a 2'×4'×2" mold of a roof insulation board with one side in the shape of roof tiles. The mixture is poured to the depth of about ¼" and it expands to fill the mold. The foam hardens within 5 to 10 minutes thereby producing a tough, strong, rigid polyurethane silicate concrete foam product with excellent flame-resistant and insulating properties.

EXAMPLE 23

10 parts by weight of an aqueous solution containing 2 parts by weight of 37% aqueous solution of formaldehyde, 2 parts by weight of broken down alkali metal oak sawdust-silicate polymer, 0.5 parts by weight of cresol methyl ether and 0.5 parts by weight of triethylamine are rapidly and thoroughly mixed at 30° C. with 25 parts by weight of a mixture containing 6 parts by weight of MDI, 1 part by weight of hexylene-1,6-diisocyanate, 10 parts by weight of quick setting cement, 3 parts by weight of trichlorotrifluoroethane and 5 parts by weight of plaster's sand. The mixture is poured into a mold to a depth of about ⅛". The mixture expands to 1" to 1¼" in thickness to produce a tough, rigid foam panel which is cut into 4'×8' sheets and may be used of insulation on wall, ceiling or roof of building.

EXAMPLE 24

Example 23 is modified wherein plaster of Paris is used in place of the quick setting cement.

EXAMPLE 25

The mixed components of Example 23 before foaming begins is poured in a layer of about ⅛" on the back side of a sheet of ¼"×4'×8" exterior fir plywood sheeting and the mixture expands to the height of about 1 inch then hardens within 5–10 minutes, thereby producing an insulated exterior siding which may be used on the exterior of building for siding and insulation.

EXAMPLE 26

About 15 parts by weight of a mixture of 4 parts by weight alkali metal cellulose-silicate condensation product as produced in Example 2e, 3 parts by weight of a sucrose amine polyol (POLY-G 71-357 produced by Olin), 1.5 part by weight of methanol, 1 part by weight of lignosulfonic acid sodium salt, 0.5 part by weight of triethylamine and 5 parts by weight of Portland cement are rapidly and thoroughly mixed at 30° C. with 20 parts by weight of a mixture containing 7 parts by weight of MDI, 2 parts by weight of trichlorotrifluoroethane, 4 parts by weight of Portland cement and 7 parts by weight of plasters sand then poured into a mold of non-weight bearing outer wall panel section, 3½"×4'×8'; the bottom of the mold is in the shape of exterior 12" up and down siding and filled up to ¼" with wet cement. The non-foaming mixture is poured to the depth of about ½" and in 30–60 seconds begins to expand. It expands to about 3½" high and hardens in about 5 minutes. A layer of indoor lime plaster is applied to the top of the foam to finish out to 4" in thickness and when hardened may be joined together with other such panels to form a non-weight bearing exterior wall. Reinforcement rods and wire mesh may also be used for added strength. The construction panels are strong, tough, light weight, rigid and has excellent insulation and fire-retardant qualities.

EXAMPLE 27

About 4 parts by weight of the polyisocyanate alkali metal cellulose silicate prepolymer as produced in Example 3 and 4 parts by weight of a mixture containing 2 parts by weight of a sucrose amine polyol (POLY G 71-530 producted by Olin), 1 part by weight of trichlorotrifluoroethane, and 1 part by weight of acetic acid are rapidly and thoroughly mixed for about 10–15 seconds then poured into a slab mold. The mixture begins to expand in 20 to 40 seconds and is cured within 1–3 minutes. The foamed slab weighs about 2 lbs. per cubic foot and is a rigid, tough foam which has excellent flame-resistance and insulation qualities. The slab is cut into sheets to be used for insulation or construction panels.

Although specific materials and conditions were set forth in the above Examples, these were merely illustrative of preferred embodiment of my invention. Various other compositions, such as the typical materials listed above, may be used where suitable. The reactive mixtures and products of my invention may hae other agents added thereto in order to enhance or otherwise modify the reaction and products. Other modifications of my invention will occur to those skilled in the art upon reading my disclosure. These are intended to be included within the scope of my invention, as defined in the appended claims.

I claim:
1. A process for producing polyisocyanate silicate plastics by the following steps:

(a) mixing Component B, an organic polyisocyanate, or polyisothiocyanate with Component A, an alkali metal cellulose silicate condensation product;

(b) agitating the mixture at 20° C. to 60° C. for 10 to 30 minutes, thereby producing a polyisocyanate silicate prepolymer;

(c) admixing Component C, an organic additive, and, optionally, Component D, a curing agent, with the polyisocyanate silicate prepolymer and allowing the resultant mixture to react, wherein said organic additive contains 1 to 9 carbon atoms, has a molecular weight of from 32 to 400 and is selected from the group consisting of monoalcohols, monothioalcohols, monophenols, monothiophenols, halomethyl group containing compounds, nitriles, esters, ethers, thioethers, ketones, nitro-group containing compounds, monocarboxylic acid chlorides, monocarboxylic acid bromides, monosulphonic acids or salts thereof, monocarboxylic acid or salts thereof, and aldehydes, with the proviso that when said organic additive is a monoalcohol, monothioalcohol, monophenol, monothiophenol or monocarboxylic acid, said mixing of Components C and D into the polyisocyanate silicate prepolymer takes place substantially simultaneously.

2. The process of claim 1 wherein Component C is a compound or radical containing a functional group corresponding to one of the following general formulae:

ROH, RSH, RCH$_2$Cl, RCH$_2$I, RCN, RNO$_2$, RCOCl, RCOBr, RSO$_2$Cl, RCOOH, RSO$_3$H, ROR, RCOOR OR

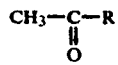

wherein R is CH$_3$-, C$_2$H$_5$- or C$_3$H$_7$-$^1$.

3. The process of claim 1, wherein said organic additive is selected from the group consisting of methanol, ethanol, propanol, isopropanol, butanol, isobutanol, t-butyl alcohol and the isomeric pentanols, hexanols and heptanols, cyclohexanol, methylcyclohexanol, methallyl alcohol, allyl alcohol, cyclohexano-methanol, benzyl alcohol, butylmercaptain, phenol, cresols, thiophenol and thiocresols; formaldehyde, acetaldehyde, propionaldehyde, butyl aldehyde, pentanals, hexanals, heptanals, octanals, and the corresponding semi-acetals and full acetals; formic acid, acetic acid, propionic acid, butyric acid, isobutyric acid, pentanoic acid, hexane carboxylic acid, heptane carboxylic acid, cyclohexane carboxylic acid, benzoil acid, toluic acid; acetyl chloride, propionic acid chloride, acetyl bromide, acid chloride of C$_4$-C$_6$ monocarboxylic acids, methane sulphonic acid chloride, benzenesulphonic acid chloride, p-toluene sulphochloride, o-toluene sulphochloride, carbamic acid chlorides, phenylcarbamic chloride; methyl acetate, ethyl acetate, propy acetate, butyl acetate, amyl acetate, the methyl and ethyl esters of propionic, butyric, pentanoic, hexanoic and heptanoic and the corresponding isomeric compounds; methyl ethyl ether, cyclohexyl methyl ether, methyl butyl ether, phenol methyl ether, thiophenol methyl ether, cresol methyl ether, tetrahydrofuranomethyl-methyl ether; ethyl chloride, ethyl bromide, ethyl iodide, n-propyl chloride, n-propyl bromide, n-propyl iodide, isopropyl chloride, isopropyl bromide, isopropyl iodide, butyl chloride, butyl bromide, butyl iodide, benzyl halides, hexahydrobenzyl halides, cyclohexano-methyl chloride, epichlorohydrin, 2-ethyl-2-chloromethyloxetane, and 2-ethyl-2-chloromethyloxetane; methyl ethyl ketone, methyl-isopropyl ketone, methyl-isobutyl ketone, methyl-isoamyl ketone, methyl-n-propyl ketone, methyl-n-butyl ketone, methyl-t-butyl ketone, methyl-furanyl ketone, methyl-tetrahydrofuranyl ketone, methyl-heptyl ketone, ethylhexyl ketone, acetophenone, W-chloroacetophenone and propionphenone; acetonitrile, propionitrile, butyronitrile, tolunitrile, hexahydrobenzonitrile, acrylonitrile, allylnitrile, methallynitrile and methacrylonitrile; nitromethane, nitroethane, nitrohexane, nitribenzene, chlorinated nitrobenzenes, nitrocyclohexanes, brominated nitrobenzenes, benzyl nitrate and nitrotoluene; methanesulphonic acid, ethanesulphonic acid, butanesulphonic acid, benzenesulphonic acid, 2-toluenesulphonic acid, 4-toluenesulphonic acid, chlorsulphonic acid esters and sulphonic acid esters; trimethylphosphite, trimethylphosphate, triethylphosphite and triethylphosphate; calcium lignosulfonate, lignosulfonic acid sodium salts, and lignin sulfate produced by alkali process and mixtures thereof.

4. The process of claim 1 wherein methanol is the organic additive of Component C.

5. The process of claim 1 wherein the components are added in the following ratio.

(a) 2 parts by weight of Component A to 1 to 10 parts by weight of Component B;

(b) 1% to 30% by weight of Component C, based on weight of Component B;

(c) Optionally, 1 to 80 parts by weight of Component D to 70 to 80 parts by weight of Component B.

6. The process of claim 1 wherein the polyisocyanate compound is selected from the group consisting of 2,4-toluene diisocyanate, 2-6-toluene diisocyanate, polyphenyl-polymethylene-isocyanates obtained by aniline-formaldehyde condensation followed by phosgenation mixtures thereof.

7. The process of claim 1 wherein Component D is selected from the group consisting of water, water containing 10% to 70% by weight of an alkali metal silicate, water containing 20% to 70% by weight of silica sol, water containing 5% to 40% by weight of magnesium oxide in the form of a colloidal dispersion, alkali metal silicate selected from the group consisting of sodium silicate, potassium silicate, lithium silicate and dry granular commercial sodium and potassium silicate, and mixtures thereof.

8. The process of claim 1 wherein up to 50% by weight, based on the reaction mixture, of a chemically inert blowing agent, boiling within the range of −25° to 80° C., is added.

9. The process of claim 1, wherein the mixture contains up to 20% by weight based on the reaction mixture, of an emulsifying agent.

10. The process of claim 1 wherein inorganic or organic particulate or pulverulent materials are added to the reaction mixture.

11. The product of the process of claim 1.

12. The process of claim 1 wherein up to 200% by weight, based on the weight of the mixture, of a water-binding agent is added and wherein the waterbinding agent is a hydraulic cement, synthetic anhydrite, gypsum or burnt lime.

13. The product of the process of claim 12.

14. The process of claim 1 wherein the Components A, B, C and D are substantially simultaneously mixed.

15. The product of the process of claim 14.

16. The process of claim 1 wherein an additional step is taken wherein the organic polyisocyanate is reacted with a polyol to produce a liquid isocyanate-terminated polyurethane prepolymer and used as Component B, and the polyol is added in the ratio of 1 to 50 mols to 50 to 99 mols of the polyisocyanate.

17. The process of claim 1 wherein a polyol is added to Component C in the ratio of 1 to 50 mols to 50 to 99 mols of Component B.

18. The process of claim 1 wherein the mixture contains from 0.001% to 10% by weight based on the reaction mixture of an activator selected from the group consisting of tertiary amines, organo-tin compounds and silaamines.

* * * * *